United States Patent
Sun et al.

(10) Patent No.: US 11,986,907 B2
(45) Date of Patent: May 21, 2024

(54) AUTOMATIC WELDDING METHOD AND DEVICE FOR PRESTRESSED TUBULAR PILES

(71) Applicant: Guangzhou Municipal Engineering Testing Co., Ltd., Guangdong (CN)

(72) Inventors: Xiaoli Sun, Guangdong (CN); Zhiguo Zhou, Guangdong (CN); Jun Yang, Guangdong (CN); Liangjun Hu, Guangdong (CN); Jixi Shao, Guangdong (CN); Decun Bian, Guangdong (CN); Yuzhu Zhang, Guangdong (CN); Hao Li, Guangdong (CN); Lu Liu, Guangdong (CN); Yongxiao Du, Guangdong (CN); Xiaohua Yuan, Guangdong (CN)

(73) Assignee: Guangzhou Municipal Engineering Testing Co., Ltd., Guangdong (CN)

( * ) Notice: Subject to any disclaimer, the term of this patent is extended or adjusted under 35 U.S.C. 154(b) by 0 days.

(21) Appl. No.: 18/109,317

(22) Filed: Feb. 14, 2023

(65) Prior Publication Data
US 2024/0024988 A1    Jan. 25, 2024

(30) Foreign Application Priority Data
Jul. 22, 2022    (CN) .......................... 202210871775.0

(51) Int. Cl.
*B23K 31/12*    (2006.01)
*B23K 31/02*    (2006.01)
*B23K 101/06*    (2006.01)

(52) U.S. Cl.
CPC ............ *B23K 31/027* (2013.01); *B23K 31/12* (2013.01); *B23K 2101/06* (2018.08)

(58) Field of Classification Search
CPC ..... B23K 11/12; B23K 11/125; B23K 11/258; B23K 11/257; B23K 31/027; B23K 31/12; B23K 31/02; B23K 31/125
See application file for complete search history.

(56) References Cited

U.S. PATENT DOCUMENTS

| | | | | |
|---|---|---|---|---|
| 3,056,183 | A | * 10/1962 | Pigeot | .................. B28B 21/205 |
| | | | | 264/315 |
| 2003/0010114 | A1 | * 1/2003 | Getman | .............. G01F 23/2967 |
| | | | | 73/32 R |
| 2010/0038076 | A1 | * 2/2010 | Spray | .................... E21B 43/103 |
| | | | | 166/207 |

(Continued)

FOREIGN PATENT DOCUMENTS

| CN | 207228185 U | * 4/2018 |
|---|---|---|
| CN | 108867623 A | * 11/2018 |
| CN | 109794666 A | 5/2019 |

(Continued)

*Primary Examiner* — Hung D Nguyen
*Assistant Examiner* — Ayub A Maye
(74) *Attorney, Agent, or Firm* — Cooper Legal Group, LLC (57) ABSTRACT

In the automatic welding method and device for prestressed tubular piles provided in the present application, which is applied in welding equipment, a detection is conducted around a connection position between prestressed tubular piles and a position of a target welding seam is obtained. Then the target welding seam is welded around the prestressed tubular piles according to the position of the target welding seam.

5 Claims, 9 Drawing Sheets

(56) References Cited

U.S. PATENT DOCUMENTS

2011/0309207 A1\* 12/2011 Senkpiel .............. F16L 59/123
　　　　　　　　　　　　　　　　　　　　　　248/65
2022/0145574 A1\* 5/2022 Wang ................. E02D 5/30

FOREIGN PATENT DOCUMENTS

| CN | 110029668 A | \* | 7/2019 | |
|---|---|---|---|---|
| CN | 210507562 U | \* | 5/2020 | |
| CN | 111618396 A | | 9/2020 | |
| WO | WO-2021017871 A1 | \* | 2/2021 | ............. E02D 33/00 |

\* cited by examiner

| Welding parameters of starting origin when welding prestressed tubular piles | | | | | | | | |
|---|---|---|---|---|---|---|---|---|
| Welding method: GMAW (Gas Metal Arc Welding) with solid welding wire | | | | | | | | |
| Measured width of welding seam: 13.00mm ☐  14.00mm ☐  15.00mm ☐  16.00mm ☒ | | | | | | | | |
| Measured depth of welding seam: 13.00mm ☐  14.00mm ☒  15.00mm ☐  16.00mm ☐ | | | | | | | | |
| Diameter of welding wire: 1.00mm ☐  1.2mm ☒  1.4mm ☐  1.6mm ☐ | | | | | | | | |
| Misalignment value: 0-1mm ☐  1-2mm ☒  2-3mm ☐  3-4mm ☐ | | | | | | | | |
| Welding gap: 0-1mm ☐  1-2mm ☐  2-3mm ☒  3-4mm ☐ | | | | | | | | |
| Gas speed (L/min): 10-15 ☐  15-20 ☐  20-25 ☐  25-30 ☒ | | | | | | | | |
| Protection gas: Ar-CO2 Mixture ☒   CO2 ☐   Other ☐ | | | | | | | | |
| Welding trajectory | Current (A) | Voltage (V) | Welding speed (mm/s) | Swing distance (mm) | Welding torch distance (ms) | Welding torch height (mm) | Welding torch angle (°) | Welding effect |
| 1. lower backing welding | 320.0 | 32.0 | 0.962 | -71.0 | 6.0 | 9.0 | -1.7 | backing welding |
| 2. bottom covering welding | 320.0 | 32.0 | 0.962 | 16.0 | 9.0 | 9.0 | -1.5 | ripple welding |
| 3. lower heat welding | 320.0 | 32.0 | 0.962 | 64.0 | 5.0 | 9.0 | -1.0 | heat welding |
| 4. middle heat welding | 300.0 | 30.0 | 0.962 | -80.0 | 6.0 | 9.0 | -0.2 | heat welding |
| 5. middle covering welding | 300.0 | 30.0 | 0.962 | 80.0 | 7.0 | 9.0 | 0.7 | ripple welding |
| 6. upper backing welding | 300.0 | 30.0 | 0.962 | -82.0 | 7.0 | 9.0 | 1.5 | backing welding |
| 7. upper covering welding | 280.0 | 28.0 | 0.962 | 16.0 | 9.0 | 9.0 | 1.8 | ripple welding |
| 8. upper heat welding | 280.0 | 28.0 | 0.962 | 75.0 | 8.0 | 9.0 | 2.2 | ripple welding |

FIG. 9

| Welding parameters of 90° position when welding prestressed tubular piles |
|---|
| Welding method: GMAW (Gas Metal Arc Welding) with solid welding wire |

| | | | | |
|---|---|---|---|---|
| Measured width of welding seam: | 13.00mm ☐ | 14.00mm ☐ | 15.00mm ☒ | 16.00mm ☐ |
| Measured depth of welding seam: | 13.00mm ☐ | 14.00mm ☐ | 15.00mm ☒ | 16.00mm ☐ |
| Diameter of welding wire: | 1.00mm ☐ | 1.2mm ☒ | 1.4mm ☐ | 1.6mm ☐ |
| Misalignment value: | 0-1mm ☐ | 1-2mm ☐ | 2-3mm ☒ | 3-4mm ☐ |
| Welding gap: | 0-1mm ☐ | 1-2mm ☐ | 2-3mm ☒ | 3-4mm ☐ |
| Gas speed (L/min): | 10-15 ☐ | 15-20 ☐ | 20-25 ☐ | 25-30 ☒ |
| Protection gas: | Ar-CO2 Mixture ☒ | CO2 ☐ | | Other ☐ |

| Welding trajectory | Current (A) | Voltage (V) | Welding speed (mm/s) | Swing distance (mm) | Welding torch distance (mm) | Welding torch height (mm) | Welding torch angle (°) | Welding effect |
|---|---|---|---|---|---|---|---|---|
| 1. lower backing welding | 320.0 | 32.0 | 0.963 | -71.0 | 5.0 | 8.5 | -1.6 | backing welding |
| 2. bottom covering welding | 320.0 | 32.0 | 0.963 | 16.0 | 8.0 | 8.5 | -1.4 | covering welding |
| 3. lower heat welding | 320.0 | 32.0 | 0.963 | 64.0 | 4.0 | 8.5 | -1.0 | heat welding |
| 4. middle heat welding | 300.0 | 30.0 | 0.963 | -80.0 | 5.0 | 8.5 | -0.2 | heat welding |
| 5. middle covering welding | 300.0 | 30.0 | 0.963 | 80.0 | 6.0 | 8.5 | 0.6 | covering welding |
| 6. upper backing welding | 300.0 | 30.0 | 0.963 | -82.0 | 6.0 | 8.5 | 1.4 | backing welding |
| 7. upper covering welding | 280.0 | 28.0 | 0.963 | 16.0 | 7.0 | 8.5 | 1.7 | covering welding |
| 8. upper heat welding | 280.0 | 28.0 | 0.963 | 75.0 | 8.0 | 8.5 | 2.1 | covering welding |

FIG. 10

| Welding parameters of 180° position when welding prestressed tubular piles |||||||||
|---|---|---|---|---|---|---|---|---|
| Welding method: GMAW (Gas Metal Arc Welding) with solid welding wire |||||||||
| Measured width of welding seam: | | 13.00mm ☐ | 14.00mm ☒ | | 15.00mm ☐ | | 16.00mm ☐ | |
| Measured depth of welding seam: | | 13.00mm ☐ | 14.00mm ☒ | | 15.00mm ☒ | | 16.00mm ☐ | |
| Diameter of welding wire: | | 1.00mm ☐ | 1.2mm ☒ | | 1.4mm ☐ | | 1.6mm ☐ | |
| Misalignment value: | | 0-1mm ☐ | 1-2mm ☒ | | 2-3mm ☐ | | 3-4mm ☐ | |
| Welding gap: | | 0-1mm ☐ | 1-2mm ☐ | | 2-3mm ☒ | | 3-4mm ☐ | |
| Gas speed (L/min): | | 10-15 ☐ | 15-20 ☐ | | 20-25 ☐ | | 25-30 ☒ | |
| Protection gas: | | Ar-CO2 Mixture ☒ | CO2 ☐ | | | Other ☐ | | |
| Welding trajectory | Current (A) | Voltage (V) | Welding speed (mm/s) | Swing distance (mm) | Welding torch distance (ms) | Welding torch height (mm) | Welding torch angle (°) | Welding effect |
| 1. lower backing welding | 320.0 | 32.0 | 0.989 | -71.0 | 6.0 | 8.0 | -1.5 | backing welding |
| 2. bottom covering welding | 320.0 | 32.0 | 0.989 | 16.0 | 9.0 | 8.0 | -1.3 | covering welding |
| 3. lower heat welding | 320.0 | 32.0 | 0.989 | 64.0 | 5.0 | 8.0 | -0.9 | heat welding |
| 4. middle heat welding | 300.0 | 30.0 | 0.989 | -80.0 | 6.0 | 8.0 | -0.2 | heat welding |
| 5. middle covering welding | 300.0 | 30.0 | 0.989 | 80.0 | 7.0 | 8.0 | 0.6 | covering welding |
| 6. upper backing welding | 300.0 | 30.0 | 0.989 | -82.0 | 7.0 | 8.0 | 1.3 | backing welding |
| 7. upper covering welding | 280.0 | 28.0 | 0.989 | 16.0 | 9.0 | 8.0 | 1.6 | covering welding |
| 8. upper heat welding | 280.0 | 28.0 | 0.989 | 75.0 | 8.0 | 8.0 | 1.9 | covering welding |

FIG. 11

| Welding parameters of 270° position when welding prestressed tubular piles |||||||||
|---|---|---|---|---|---|---|---|---|
| Welding method: GMAW (Gas Metal Arc Welding) with solid welding wire |||||||||
| Measured width of welding seam: | 13.00mm ☐ | | 14.00mm ☐ | | 15.00mm ☒ | | 16.00mm ☐ | |
| Measured depth of welding seam: | 13.00mm ☐ | | 14.00mm ☐ | | 15.00mm ☐ | | 16.00mm ☒ | |
| Diameter of welding wire: | 1.00mm ☐ | | 1.2mm ☒ | | 1.4mm ☐ | | 1.6mm ☐ | |
| Misalignment value: | 0-1mm ☐ | | 1-2mm ☐ | | 2-3mm ☒ | | 3-4mm ☐ | |
| Welding gap: | 0-1mm ☐ | | 1-2mm ☐ | | 2-3mm ☒ | | 3-4mm ☐ | |
| Gas speed (L/min): | 10-15 ☐ | | 15-20 ☐ | | 20-25 ☐ | | 25-30 ☒ | |
| Protection gas: | Ar-CO2 Mixture ☒ | | CO2 ☐ | | | | Other ☐ | |
| Welding trajectory | Current (A) | Voltage (V) | Welding speed (mm/s) | Swing distance (mm) | Welding torch distance (mm) | Welding torch height (mm) | Welding torch angle (°) | Welding effect |
| 1. lower backing welding | 320.0 | 32.0 | 0.953 | -71.0 | 5.0 | 8.5 | -1.4 | backing welding |
| 2. bottom covering welding | 320.0 | 32.0 | 0.953 | 16.0 | 8.0 | 8.5 | -1.2 | covering welding |
| 3. lower heat welding | 320.0 | 32.0 | 0.953 | 64.0 | 4.0 | 8.5 | -0.8 | heat welding |
| 4. middle heat welding | 300.0 | 30.0 | 0.953 | -80.0 | 5.0 | 8.5 | -0.2 | heat welding |
| 5. middle covering welding | 300.0 | 30.0 | 0.953 | 80.0 | 6.0 | 8.5 | 0.5 | covering welding |
| 6. upper backing welding | 300.0 | 30.0 | 0.953 | -82.0 | 6.0 | 8.5 | 1.2 | backing welding |
| 7. upper covering welding | 280.0 | 28.0 | 0.953 | 16.0 | 8.0 | 8.5 | 1.5 | covering welding |
| 8. upper heat welding | 280.0 | 28.0 | 0.953 | 75.0 | 7.0 | 8.5 | 1.8 | covering welding |

ID
AUTOMATIC WELDDING METHOD AND DEVICE FOR PRESTRESSED TUBULAR PILES

CROSS-REFERENCE TO RELATED APPLICATION

This application claims the priority and benefit of Chinese patent application serial no. 202210871775.0, filed on Jul. 22, 2022. The entirety of Chinese patent application serial no. 202210871775.0 is hereby incorporated by reference herein and made a part of this specification.

TECHNICAL FIELD

The present application relates to a field of welding and in particular, relates to an automatic welding method for prestressed tubular piles and a related device.

BACKGROUND ART

The prestressed tubular pile (also known as prestressed concrete tubular pile) includes a plurality of forms such as PHC (Prestressed High-strength Concrete), PC (Prestressed Concrete) and PTC (Prestressed Thin Concrete), which is an established pile foundation construction technology. It is widely used throughout the country due to the advantages of a simple process, an easily controlled construction quality, a high construction efficiency, a short construction duration, and a strong vertical bearing capacity.

At present, for conducting construction using the prestressed tubular piles, the construction is mainly conducted by segmental welding. In particular, a lower tubular pile of the prestressed tubular pile to be welded is sunk into a soil body, then an upper tubular pile thereof is hoisted to align with the lower tubular pile. The upper tubular pile is lowered so that end plates of two pile sections are abutted to each other. Welding is conducted around a seam between two end plates, the pile continues to be sunk after the upper and lower tubular piles are joined into an integration. Then another section of the prestressed tubular pile is hoisted in position to be welded. It continues to sink the pile after finishing welding. The process is repeated until the whole task of pile sinking is finished.

However, the welding operation of the traditional prestressed tubular pile mainly adopts the manual gas shielded welding method. The fatigue and mistakes are unavoidable in manual operation, which is influenced by factors such as environment and welding operator. The welding operators have uneven operation levels, so that the welding quality is hard to be ensured. At the same time, the welding efficiency of the tubular pile has reached a bottleneck due to factors such as aging of the welding operators, an increasing shortage of welding operators, and an increased labor cost. In addition, the manual welding is strongly relied on the personal experience, which is hard to control the welding quality and realize a standard operation.

Therefore, it is urgent to provide an efficient and automatic welding method for prestressed tubular piles.

SUMMARY

In order to overcome at least one deficiency, the present application including the following aspects is intended at least to provide an automatic welding method for prestressed tubular piles and a related device, so as to realize an automatic welding of a seam between the prestressed tubular piles.

In a first aspect, the present application provides an automatic welding method for prestressed tubular piles, which is applied in welding equipment. The method includes:
   conducting a detection on a connection position between the prestressed tubular piles and obtaining a position of a target welding seam, in which the prestressed tubular piles are arranged along a vertical direction; and
   welding the target welding seam around the prestressed tubular piles according to the position of the target welding seam.

In a second aspect, the present application provides an automatic welding device for prestressed tubular piles, which is applied in the welding equipment. The device includes:
   a welding seam detecting module, which is configured to conduct a detection on a connection position between the prestressed tubular piles and obtain a position of a target welding seam, in which the prestressed tubular piles are arranged along a vertical direction; and
   a welding seam welding module, which is configured to weld the target welding seam around the prestressed tubular piles according to the position of the target welding seam.

In a third aspect, the present application provides a computer storage medium, which is stored with a computer program, the automatic welding method for prestressed tubular piles is performed when the computer program is executed by a processor.

In a fourth aspect, the present application provides a welding equipment, which includes a welding equipment body, a processor, and a memory, in which a computer program is stored in the memory, and the automatic welding method for prestressed tubular piles is performed when the computer program is executed by the processor.

The present application has the following beneficial effect compared with the existing technology.

In the automatic welding method and device for prestressed tubular piles provided in the present application, which is applied in the welding equipment, the welding equipment conducts a detection on a connection position between the prestressed tubular piles and determines a position of a target welding seam. Then, a welding is conducted around the prestressed tubular piles according to the position of the target welding seam, so as to solve the technical problem caused by the manual gas shielded welding method in the existing technology, realizing an automatic welding of the welding seam at the connection position between the prestressed tubular piles.

BRIEF DESCRIPTION OF THE DRAWINGS

The drawings required in the embodiments is briefly introduced below in order to explain the technical solution of the embodiments in the present application more clearly. It should be understood that the following drawings only illustrate a certain of embodiments in the present application, which should not be regarded as the limitation of the scope. Those skilled in the art can obtain other related drawings according to these drawings without creative efforts.

DETAILED DESCRIPTION

The technical solution of the embodiments in the present application is clearly and completely described below in combination with the drawings of the present application, in order to make the purposes, technical solutions and advantages of the embodiments in the present application more clearly.

The embodiment provides an automatic welding method for prestressed tubular piles, which is applied in the welding equipment. In this method, the welding equipment conducts a detection on a connection position between the prestressed tubular piles and determines a position of a target welding seam. Then, a welding is conducted around the prestressed tubular piles according to the position of the target welding seam, so as to realize an automatic welding of the welding seam at the connection position between the prestressed tubular piles.

The welding equipment can also adopt an intelligent welding robot designed for a scenario of welding the prestressed tubular piles. The welding equipment body of this intelligent welding robot includes a welding component body configured for conducting welding operations, an annular track configured to move around the prestressed tubular pile, a welding power source movable vehicle configured to provide a portable power source, a welding system movable vehicle, a robot control system (including a processor and a memory), a cloud monitoring and security management platform, a welding seam tracking system, a welding power source with communication function, a wire feeding machine, a control handle, and a human-machine interface.

In addition, the welding equipment can also adopt a welding robot a standard six-axis robot, or a four-axis SCARA robot, each of which is equipped with a laser measuring instrument. The connection position of prestressed tubular piles is detected by the laser measuring instrument, so as to obtain a position of a target welding seam and related welding seam parameters of the welding seam.

Figure 1:
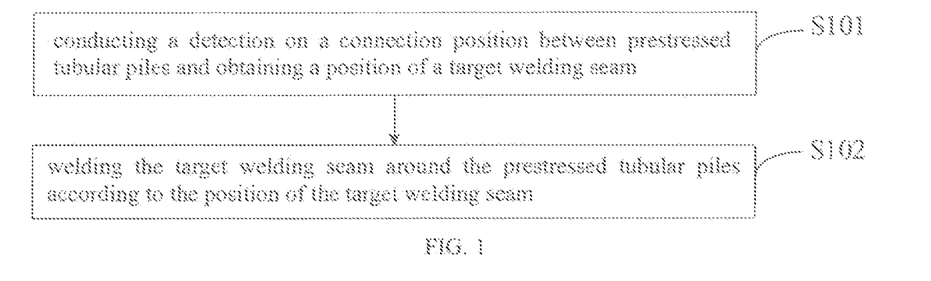
FIG. 1 is a flow chat diagram of a method provided in an embodiment of the present application.

Based on the above description, an automatic welding method for prestressed tubular piles provided in this embodiment is described in detail in combination with FIG. 1, so that those skilled in the art can implement the technical solution provided in the present application. Referring to FIG. 1, the method includes:

step S101, conducting a detection on a connection position between the prestressed tubular piles and obtaining a position of a target welding seam.

It should be noted that a preparation before welding is required before welding the prestressed tubular piles. For example, when conducting a pile sinking construction of prestressed tubular piles in a super large bridge construction of an expressway, a diameter of the tubular pile can reach 1000 mm. The construction generally adopts a machine for drilling with prestressed high strength concrete pipe cased pile. The tubular pile machine sinks the lower tubular pile in the soil body with the drill. Then the upper section of the tubular pile is hoisted to align with the lower tubular pile, so that two can be aligned with each other. Before aligning the piles, it is required to remove the foreign bodies influencing the welding effect, such as soil, oil, rust on the end plate surfaces of upper and lower tubular piles, by using cleaning tools like a small shovel and a steel brush. In addition, it is determined that an misalignment value of an end cover plate of the tubular piles ≤3 mm, and the upper tubular pile is lowered, so that the end cover plates of each section of the tubular piles are abutted to each other. If the misalignment value >3 mm and a welding gap >3 mm, it is required to clean the end cover plate and conduct the pile alignment operation repeatedly to ensure the quality of the pile connection.

In addition, if the welding equipment adopts the intelligent welding robot that mentioned in the above embodiment, four reference blocks with magnetic forces are respectively provided at the welding seams of the tubular piles, which is configured for guiding the annular track to mount on the upper tubular pile accurately. A steel belt buckle is fastened, and four reference blocks are detached after confirmation. The welding robot is mounted on the basis of the annular track. Then the robot is manually controlled to conduct a single stage action: feeding wire, gas detection, actions of four axis, and check of arc striking point. An origin of the robot is set after confirmation, and the welding preparation is determined to be finished.

Figure 2:
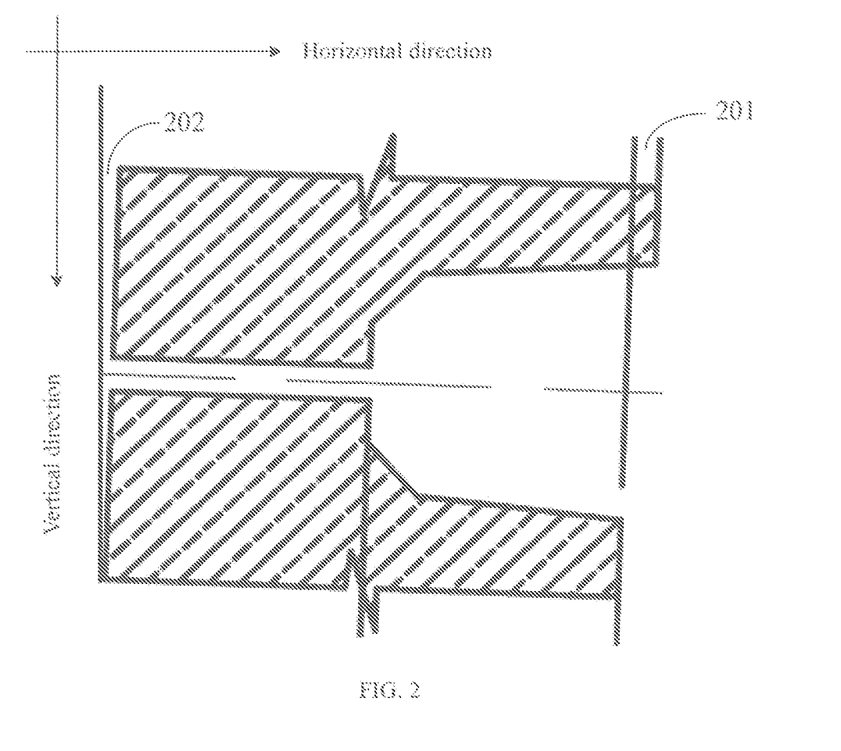
FIG. 2 is a connection schematic diagram of prestressed tubular piles provided in an embodiment of the present application.

It should be noted that the prestressed tubular piles are arranged along a vertical direction in this embodiment, which leads to a connection effect between the prestressed tubular piles as shown in FIG. 2 in the actual construction of the prestressed tubular piles. That is, a certain of a misalignment deviation 201 and a vertical deviation 202 corresponding to the verticality thereof exists in the tubular pile misalignment value, further leading to a change in a width and a depth of the welding seam. Therefore, when the welding equipment welds the prestressed tubular piles, each time a section of a target welding seam is determined to be welded until the whole welding seam is welded.

For example, the welding equipment divides the welding seam in an annular shape into four portions. Each portion is corresponding to 90°. Therefore, when the welding equipment welds at the connection position of the prestressed tubular piles, each time a next target welding seam is obtained by rotating for 90° on the basis of the pervious target welding seam. The welding operation of the prestressed tubular piles can be finished after 4 times. Of course, those skilled in the art can further divide the annular welding seam according to the requirements of the accuracy and the welding process, and each target welding seam is welded, so as to realize a track of the welding seam between the prestressed tubular piles and a self-adaptive adjustment.

Figure 3:
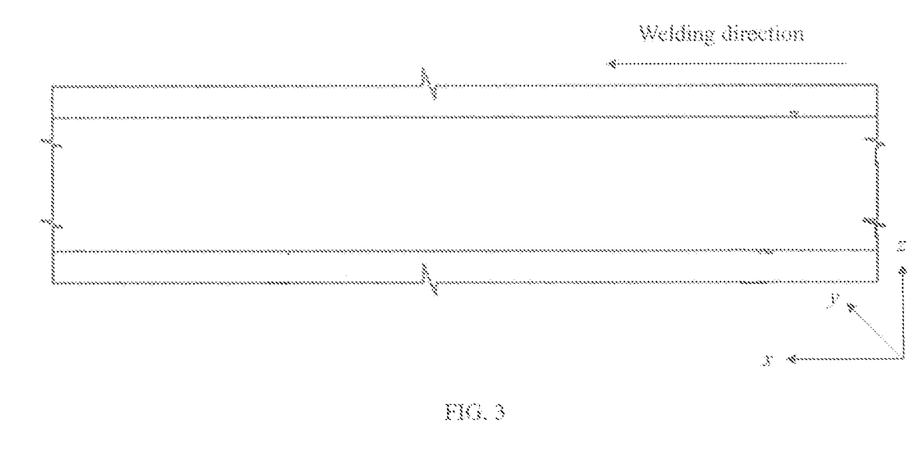
FIG. 3 is a schematic diagram of a coordinate system provided in an embodiment of the present application.

Further, the welding equipment can also establish a coordinate system of an operation space for determining a position of the target welding seam in the operation space. Regarding the position of the target welding seam, as shown in FIG. 3, the coordinate system is established based on the reference position determined by the welding equipment. An x-axis of the coordinate system is parallel to a tangent of the target welding seam, which is configured to indicate a welding direction when welding the prestressed tubular piles. A z-axis of the coordinate system points to a vertical direction. A y-axis of the coordinate system points to the target welding seam. Therefore, the position of the target welding seam can be determined based on the coordinate system, so that the welding equipment can obtain the position of the target welding seam when welding the target welding seam.

Step S102, welding the target welding seam around the prestressed tubular piles according to the position of the target welding seam.

It can be known from the above description of the prestressed tubular pile construction process, the prestressed tubular piles should be arranged along the vertical direction in the construction process, and the prestress tubular pile has a cylinder shape. Therefore, a section of the target welding seam is welded around the prestressed tubular pile after the section of the target welding seam is determined, in order to realize the automatic welding of the welding seam of the prestressed tubular piles.

Therefore, the welding equipment realizes the automatic welding of the prestressed tubular pile with the above technical solution, so as to solve the problem existing in the manual welding method, and reach the purpose of improving the welding efficiency and stabilizing the welding quality.

The embodiment provides a plurality of welding processes when welding the target welding seam around the prestressed tubular pile, such as resurfacing welding and multi-layer and multi-pass welding. The implementation methods of these two processes are respectively described in detail below.

If the welding of the target welding seam adopts the resurfacing welding, the step S102 includes step S102-1A, dividing the target welding seam into a plurality of welding areas at the position of the target welding seam according to a width and a depth of the target welding seam.

The plurality of welding areas is arranged along the vertical direction. It should be noted that the welding operator can ensure the welding solution not to drip down according to the personal welding experience when the manual welding is adopted. Therefore, the embodiment should not only realize the automatic welding of the welding seam, but also make the welding quality of the welding seam meet the manual welding standard. Therefore, a voltage and a current of the welding power source is controlled to be rapidly changed with a welding trajectory in the one-time welding and forming process by resurfacing welding, so as to improve the efficiency and obtain a stable control of the welding solution without dripping.

After several experiments and studies, it is found that dividing the target welding seam into the plurality of welding areas and welding in each area by adopting set process parameters can realize the purpose of improving the efficiency and obtaining a stable control of the welding solution without dripping. The plurality of welding areas of the target welding seam is exemplarily described below in combination with FIG. 4. As shown in the section diagram of FIG. 4, it includes a tubular pile section 203 of the prestressed tubular pile and a welding seam section 204 of the target welding seam. The welding seam section 204 is divided into 3 welding areas along a horizontal direction and is divided into an upper area 205, a middle area 206 and a lower area 207 along the vertical direction from top to bottom. When the welding trajectory of the welding wire reach these three areas, the welding respectively adopts the set process parameters for each area, in which the process parameters include the current and the voltage.

It is further found that placing the welding wire at a position above a horizontal central line when determining the starting origin of the welding wire can ensure an overall upward movement of the whole welding trajectory of the welding wire, so that the furnace hearth generated after the melting of the welding wire can be well controlled without serious dripping. Therefore, step S102 further includes:

step S102-2A, determining a central line horizontally dividing the target welding seam into two equal portions;

step S102-3A, determining a starting origin in the middle area according to the central line, in which the starting origin is positioned above the central line; and step S102-4A, placing the welding wire at the starting origin.

For example, a center coordinate of welding in z-axial is calculated:

$$Z_0 = H/2 + k_7,$$

in which $Z_0$ is a distance between the position of the starting origin and a lower boundary of the target welding seam, H represents the width of the target welding seam, and $k_7$ represents a deviation coefficient of the starting origin.

Assumed that the width of the prestressed tubular pile is 16.0 mm and the deviation coefficient is 1 mm, based on the equation of the starting origin, the distance between the position of the starting origin and the lower boundary of the target welding seam is:

$$Z_0 = 16/+1 = 9$$

That is the distance between the position of the starting origin and the lower boundary of the target welding seam is 9 mm.

Step S102-5A, determining a welding surface of each welding area, in which the welding surface of each welding area is parallel to an outer wall of the prestressed tubular pile. After several experiments and studies, in order to realize the purpose of improving the efficiency and obtaining a stable control of the welding solution without dripping, it is required not only to divide the target welding seam into the plurality of welding areas, but also to respectively determine the welding surface of each welding area, so that the trajectory of the welding wire during welding is moved in a space defined by the welding surface, in which the space defined by the welding surface of each welding area is positioned between the welding surface and the outer wall.

Figure 4:
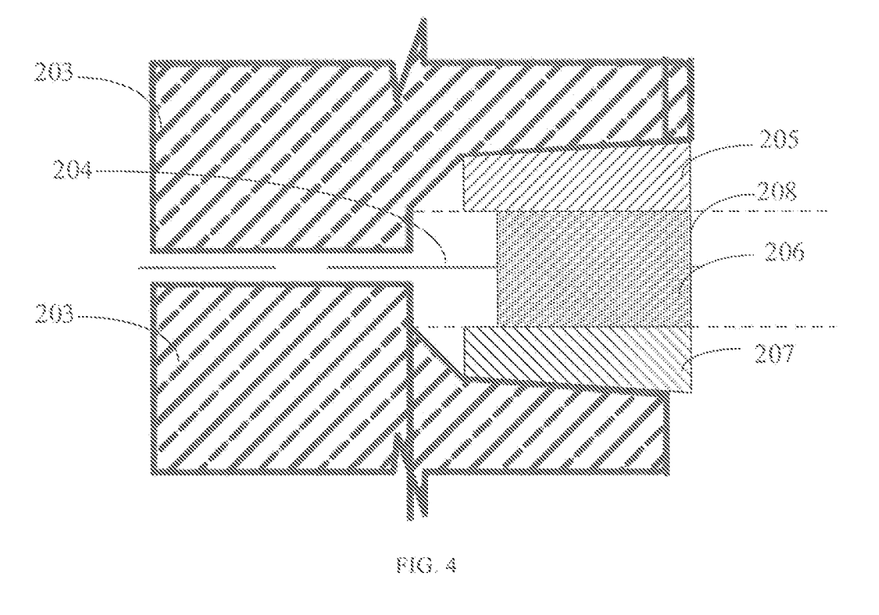
FIG. 4 is a division schematic diagram of a welding seam provided in an embodiment of the present application.

Further referring to FIG. 4, an outer wall 208 of the prestressed tubular pile is taken as a reference surface when determining the welding surface of each welding area in this embodiment. In the embodiment, the welding equipment determine the distance between the welding surface of each welding area and the outer wall 208 according to the depth and the position coefficient of each welding area, then respectively determine the welding surface of each welding area according to the distance between the welding surface of each welding area and the outer wall 208.

For example, after the welding equipment receives the depth of the target welding seam, the distances from the starting origin of welding wire movement in the welding seam, the welding surface of the lower area 207, the welding surface of the middle area 206, and the welding surface of the upper area 205 to the outer wall 208 can calculated by the following equations:

$$R_1 = d + k_3,$$

in which $R_1$ represents the distance between the starting origin and the outer wall 208, d represents the depth of the target welding seam, and $k_3$ represents the position coefficient of the starting origin.

$$S_1 = -d + k_4,$$

in which $S_1$ represents the distance between the lower area 207 and the outer wall 208, d represents the depth of the target welding seam, and $k_4$ represents the position coefficient of the lower area 207.

$$T_1 = -d + k_5,$$

in which $T_1$ represents the distance between the middle area 206 and the outer wall 208, d represents the depth of the target welding seam, and $k_5$ represents the position coefficient of the middle area 206.

$$U_1 = -d + k_6,$$

in which $U_1$ represents the distance between the lower area 207 and the outer wall 208, d represents the depth of the target welding seam, and $k_6$ represents the position coefficient of the lower area 207.

According to the above equations, assed that the depth of the prestressed tubular pile in FIG. 4 is 16.0 mm, depth coefficient $k_3$ is 20.0, $k_4$ is 23.0, $k_5$ is 21.0, and $k_6$ is 23.0, then the distances from the starting origin, the welding surface of the lower area 207, the welding surface of the middle area 206, and the welding surface of the upper area 205 to the outer wall 208 are:

$$R_1 = -16.0 + 20.0 = 4$$

$$S_1 = -16.0 + 23 = 7$$

$$T_1 = -16 + 21 = 5$$

$$U_1 = -16 + 23 = 7.$$

That is, the distances from the starting origin, the welding surface of the lower area 207, the welding surface of the middle area 206, and the welding surface of the upper area 205 to the outer wall 208 are 4.0 mm, 7 0 mm, 5 0 mm and 7.0 mm respectively.

Step S102-6A, conducting welding in the space defined by the welding surface of each welding area in turn with the set process parameters according to the welding sequence of the plurality of welding areas.

For the plurality of welding areas including the middle area, the lower area and the upper area, it is found after huge experiments, welding in a sequence of "middle area-lower area-middle area-upper area-middle area" can obtain a better welding effect of the welding seam between the prestressed tubular piles. The detail technical solution includes the following steps.

Step S102-6A-1, welding from the starting origin in the middle area to the lower area using the set process parameters for the middle area along a first welding trajectory in the middle area.

The welding trajectory in the middle area is positioned in the space defined by the welding surface of the middle area, and the starting origin is also positioned in the middle area.

Step S102-6A-2, welding from the lower area to the middle area using the set process parameters for the lower area along a welding trajectory in the lower area.

The welding trajectory in the lower area is positioned in the space defined by the welding surface of the lower area.

Step S102-6A-3, welding from the middle area to the upper area using the set process parameters for the middle area along a second welding trajectory in the middle area.

The second welding trajectory in the middle area is positioned in the space defined by the welding surface of the middle area.

Step S102-6A-4, welding from the upper area to the middle area using the set process parameters for the upper area along a welding trajectory in the upper area.

The welding trajectory in the upper area is positioned in the space defined by the welding surface of the upper area.

Step S102-6A-5, welding from the middle area to the starting origin using the set process parameters for the middle area along a third welding trajectory in the middle area.

The third welding trajectory in the middle area is positioned in the space defined by the welding surface of the middle area.

When welding the target welding seam in the embodiment, the moving trajectories of the welding wire are positioned between the welding surface of each welding area and the outer wall. In addition, after study, the voltage and the current of the process parameters in a medium value are adopted when welding in the middle area, the voltage and the current of the process parameters in a high value are adopted when welding in the lower area, and the voltage and the current of the process parameters in a low value are adopted when welding in the upper area, so as to reach a better welding effect, obtaining a welding effect of full welding and ensuring the welding furnace hearth without dripping.

Further, for the trajectory of the welding wire in the target welding space, a plurality of trajectories can reach the purpose of welding in the sequence of "middle area-lower area-middle area-upper area-middle area".

Figure 5:
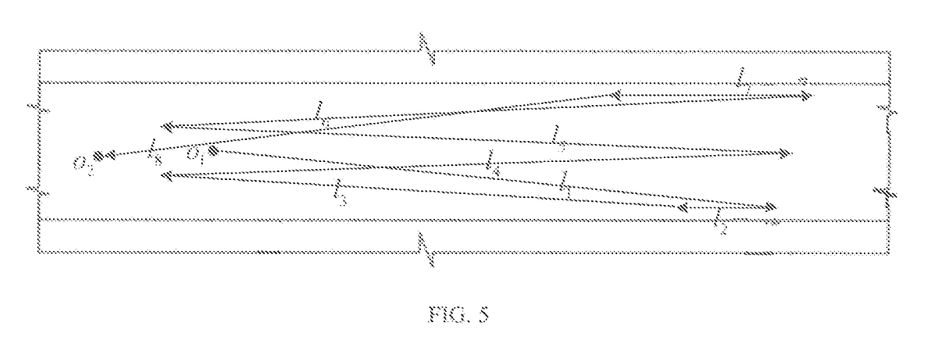
FIG. 5 is a first schematic diagram of a resurfacing welding trajectory provided in an embodiment of the present application.
Figure 6:
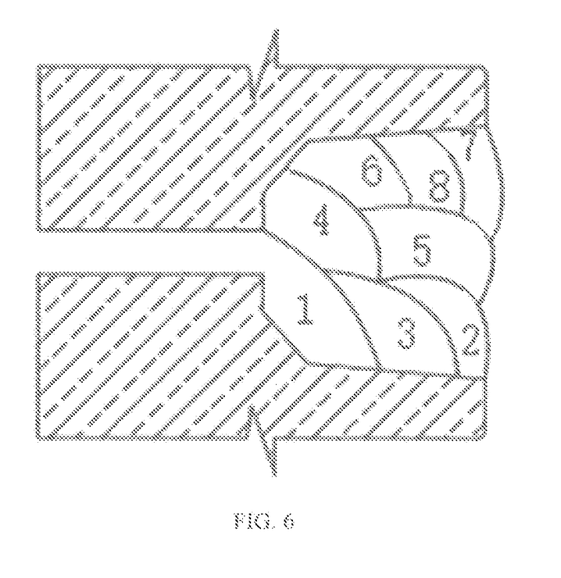
FIG. 6 is a first schematic diagram of a resurfacing welding bead provided in an embodiment of the present application.

As one of the examples, in the welding trajectory shown in FIG. 5, $o_1$ represents the starting origin of the current target welding seam, and $o_2$ represents the starting origin of the next target welding seam. The welding equipment controls the welding wire to move from the middle area to the lower area along a trajectory $l_1$, further controls the welding wire to move from the lower area to the middle area along a trajectory $l_2 \to l_3$, further controls the welding wire to move from the middle area to the upper area along a trajectory $l_4$, further controls the welding wire to move from the upper area to the middle area along a trajectory $l_5$, and finally controls the welding wire to move to the starting origin $o_2$ of the next target welding seam in the middle area along a trajectory $l_6 \to l_7 \to l_8$. When welding along the welding trajectories in FIG. 5, the stacking effect of the welding bead is shown in FIG. 6. The welding bead corresponding to the trajectory $l_1$ is marked as a reference "1" in FIG. 6, and the welding bead corresponding to the trajectory $l_2$ is marked as a reference "2". By analogy, the corresponding relationship between other trajectories and weld beads can be obtained.

Figure 7:
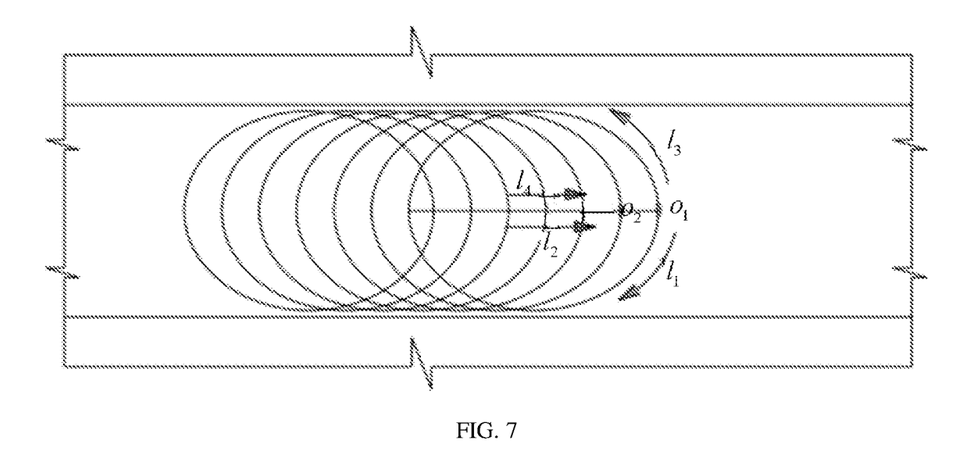
FIG. 7 is a second schematic diagram of a resurfacing welding trajectory provided in an embodiment of the present application.
Figure 8:
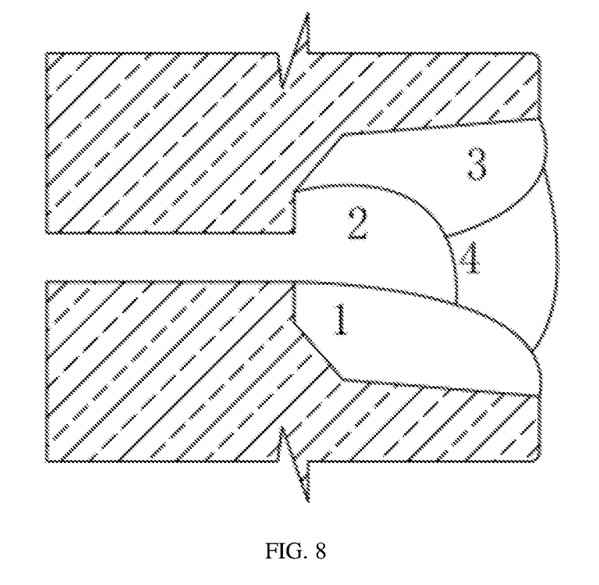
FIG. 8 is a second schematic diagram of a resurfacing welding bead provided in an embodiment of the present application.

As another example, in the welding trajectory shown in FIG. 7, $o_1$ represents the starting origin of the current target welding seam, and $o_2$ represents the starting origin of the next target welding seam. The welding equipment controls the welding wire to move from the middle area to the lower area and then back to the middle area along a trajectory $l_1$, further controls the welding wire to move back to the starting origin $o_1$ along a trajectory $l_2$, further controls the welding wire to move from the middle area to the upper area and then back to the middle area along a trajectory $l_3$, and finally controls the welding wire to move to the starting origin $o_2$ of the next target welding seam in the middle area along a trajectory $l_4$. When welding along the welding trajectories in FIG. 7, the stacking effect of the welding bead is shown in FIG. 8. The welding bead corresponding to the trajectory $l_1$ is marked as a reference "1" in FIG. 8, and the welding bead corresponding to the trajectory $l_2$ is marked as a reference "2". By analogy, the corresponding relationship between other trajectories and weld beads can be obtained.

The above is the description of the resurfacing welding process. If the welding of the target welding seam adopts multi-layer and multi-pass welding, the step S102 further includes: Step S102-1B, determining a moving speed when welding around the prestressed tubular pile according to the width and the depth of the welding seam.

In the multi-layer and multi-pass welding, the welding equipment generates multiple welding beads at the welding seam around the prestressed tubular pile, and each welding bead is generated based on the previous welding bead. The moving speed when welding around the prestressed tubular pile should be limited in order to ensure the welding furnace hearth without dripping.

After study, for the moving speed along the x-axis during welding, the moving speed decreases when the width of the welding seam increases, and the moving speed increases when the width of the welding width decreases. Therefore, the moving speed during welding is inversely proportional to the width of the welding seam.

Similarly, the moving speed decreases when the depth of the welding seam increases, and the moving speed increases when the depth of the welding width decreases. Therefore, the moving speed during welding is inversely proportional to the depth of the welding seam. Based on these the inventor of the present application proposed the following equation for determining the moving speed in the multi-layer and multi-pass welding after a lot of experiments and verifications:

$$V_1 = k_1/H + k_2/D + \Phi_1,$$

in which $V_1$ represents the moving speed, $k_1$ represents a first speed coefficient, $k_2$ represents a second speed coefficient, H represents the width, D represents the depth, and $\Phi_1$ represents a compensation coefficient.

For example, assumed that the horizontal width of the prestressed tubular pile is 16 mm and the depth is 15 mm, $k_1$ is 3.05, $k_2$ is 2.4, and $\Phi_1$ is 0.6, based on the above equation, the moving speed when welding the target welding seam is:

$$V_1 = 3.05/16 + 2.4/16 + 0.6 = 0.94.$$

That is, the moving speed when welding is 0.94 mm/s.

Step S102-2B, determining process parameters matching a layer number of wending passes to be generated of the target welding seam.

Step S102-3B, welding the target welding seam around the prestressed tubular pile at the moving speed using the process parameters matching the layer number of wending passes.

After the welding equipment receives the width and the depth of the target welding seam, the moving speed during welding can be calculated by this equation, so as to weld the welding bead with the set process parameters according to this moving speed, obtaining an ideal welding effect.

In order to make it easier for those skilled in the art to implement the present application, it is assumed that the welding seam between prestressed tubular piles is divided into four equal parts, and the seam parameters of each target welding seam are as follows:

|  | Welding origin | 90° position | 180° position | 270° position |
| --- | --- | --- | --- | --- |
| Welding seam width | 16.0 | 15.0 | 14.0 | 15.0 |
| Welding seam depth | 14.0 | 15.0 | 14.0 | 16.0 |

In the embodiment, the welding equipment is required to move around the prestressed tubular pile 8 times, conducting a lower backing welding, a bottom covering welding and a lower heat welding in the middle area, conducting a middle heat welding and a middle covering welding in the middle area, and conducting an upper backing welding, an upper covering welding and an upper heat welding in the upper area.

Figure 9:
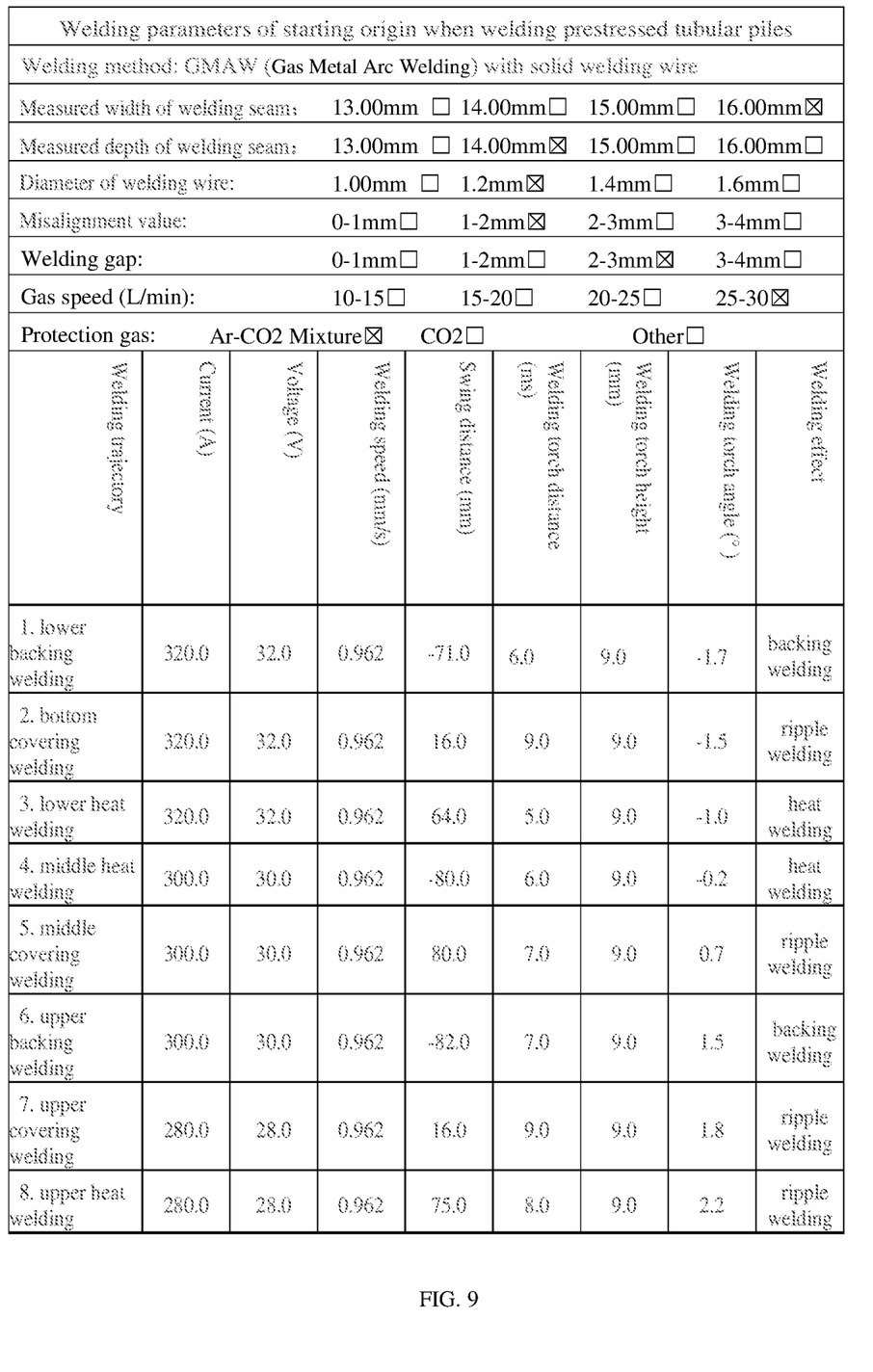
FIGS. 9-12 are relevant parameter tables of multi-layer and multi-pass welding provided in embodiments of the present application.

Based on these, the welding equipment receives the data in the above table. The related parameters of the target welding seam from the welding origin to the 90° position obtained by calculation is shown in FIG. 9.

Figure 10:
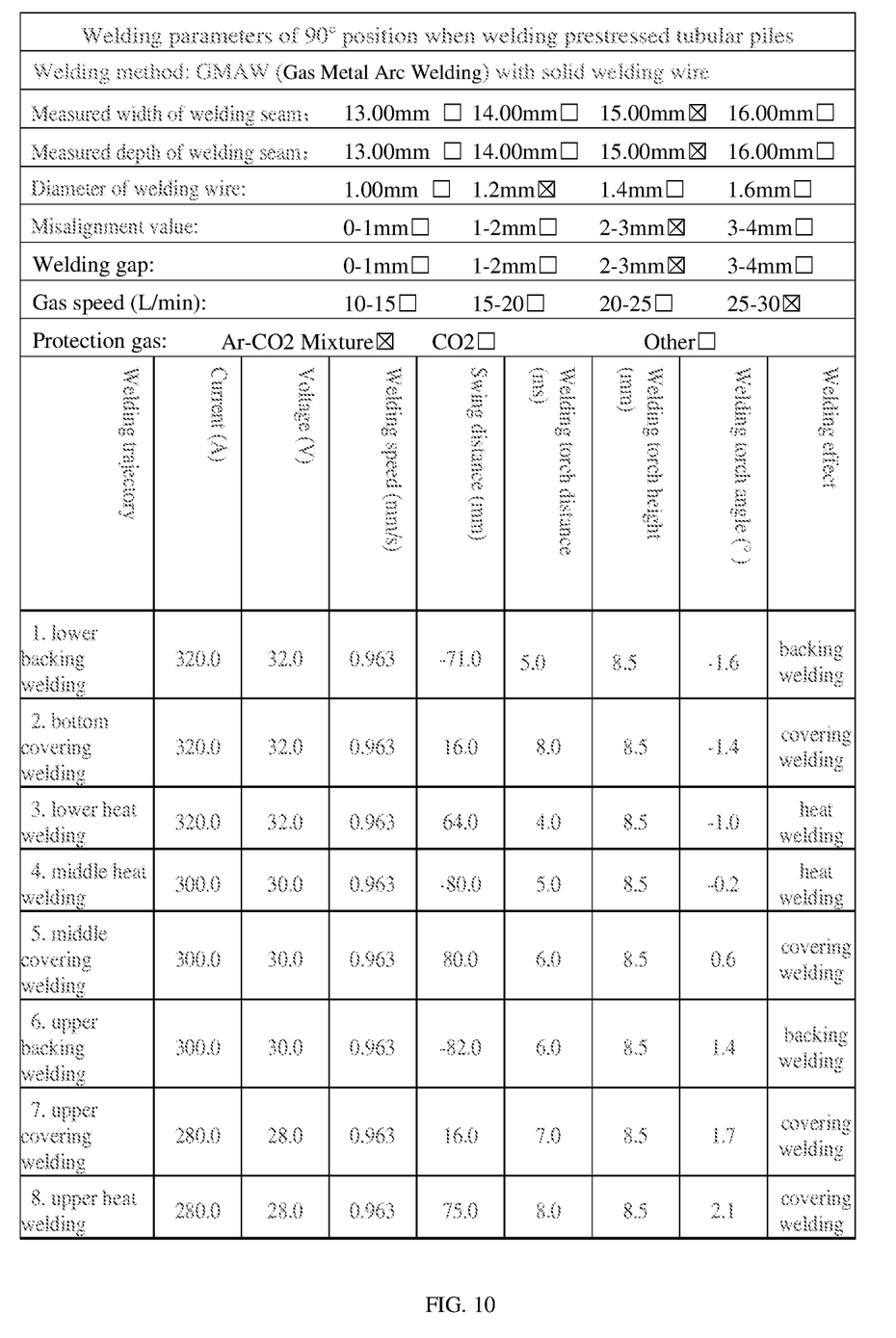

Further, after the welding equipment reaching the 90° position, the related parameters for the next target welding seam shown in FIG. 10 is called to control and realize a smooth transition of welding.

Figure 11:
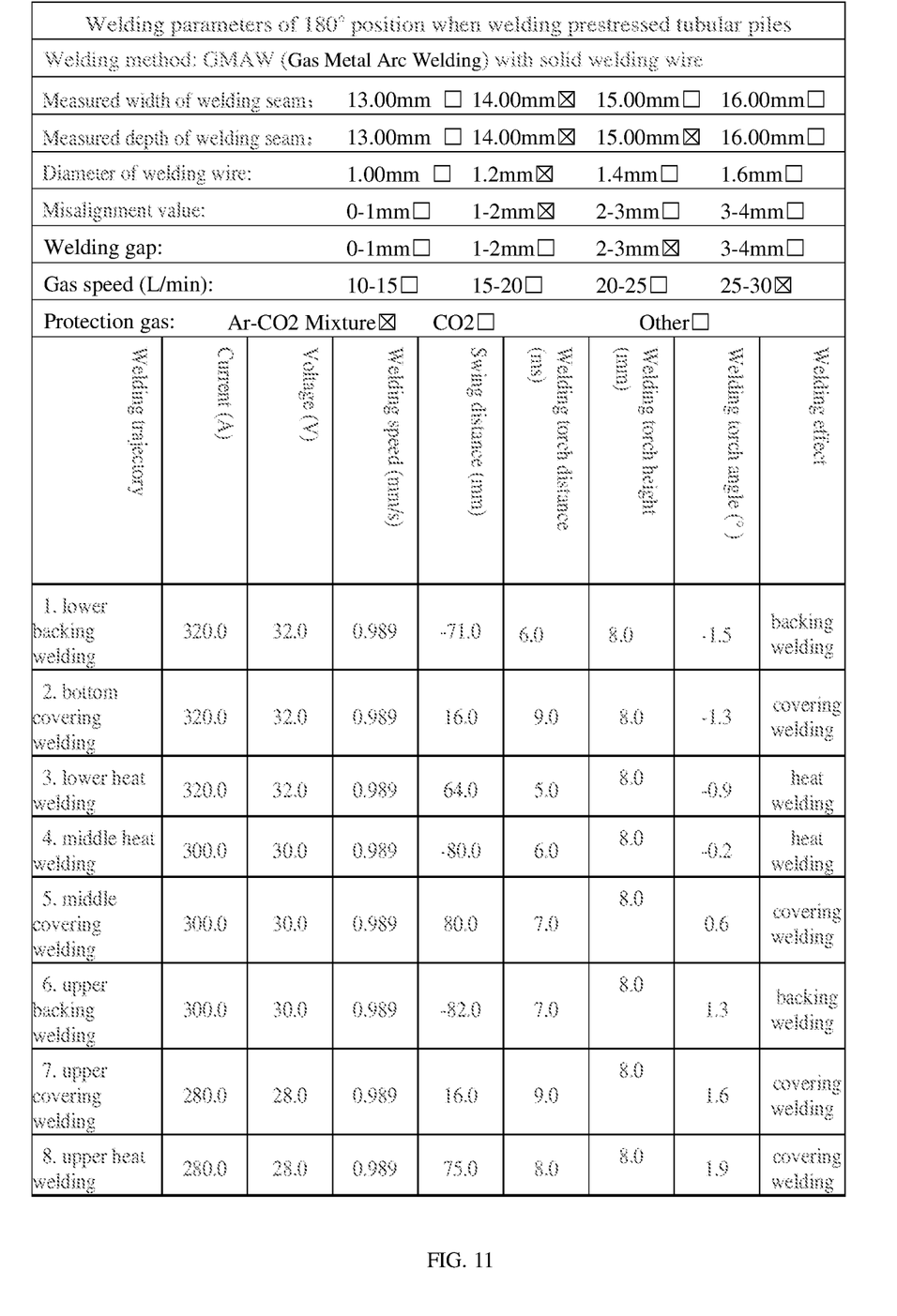

Further, after the welding equipment reaching the 180° position, the related parameters for the next target welding seam shown in FIG. 11 is called to control and realize a smooth transition of welding.

Figure 12:
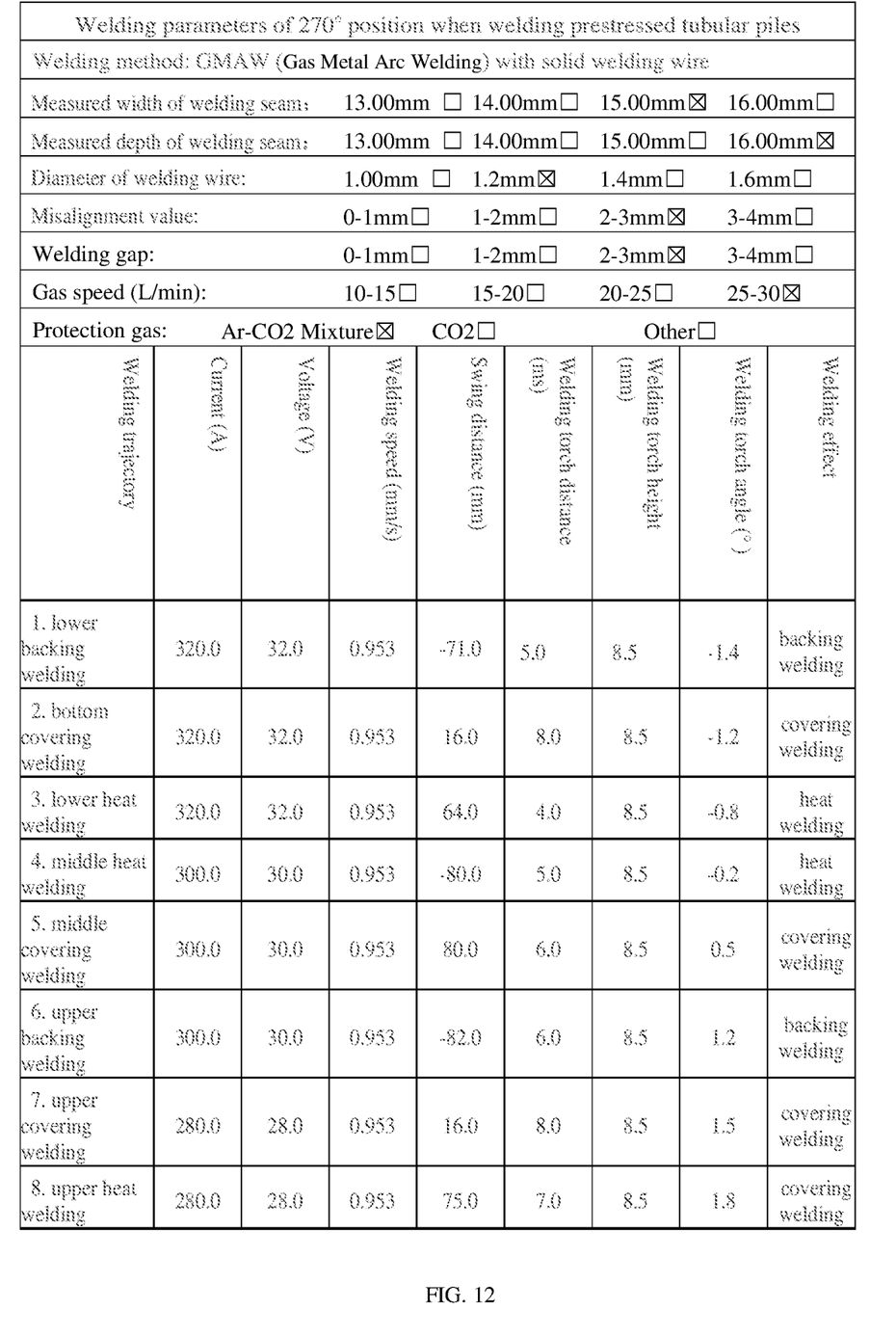

Finally, after the welding equipment reaching the 270° position, the related parameters for the next target welding seam shown in FIG. 12 is called to control and realize a smooth transition of welding, so as to obtain a circle of the welding bead.

In addition, it should be noted that an elevation angle of the welding torch for fixing the welding wire when welding in the upper area and a depression angle thereof when welding in the lower area are limited in the resurfacing welding and the multi-layer and multi-pass welding. In the embodiment, the elevation angle and the depression angle is calculated by the following equation, in which the fulcrum of the welding torch is taken as the center of a circle and the distance between the welding torch mouth (the position where the welding wire is fixed) and the fulcrum is taken as the radius.

$$w_0 = \arctan\left(\frac{H+2}{2*k_8}\right),$$

$$\theta_0 = \arctan\left(\frac{H-2}{2*k_8}\right),$$

in which $w_0$ represents the depression angle, $\theta_0$ represents the elevation angel, H represents the width of the welding seam, $k_8$ represents the distance between the fulcrum of the welding torch and the outer wall.

For example, assumed that the width of the target welding seam between the prestressed tubular piles is 16.0 mm, and the distance between the fulcrum of the welding torch and the outer wall is 236 mm, the elevation angle of welding along D-axis (direct axis) $w_0$=2.20, the depression angle $\theta_0$=1.70.

Figure 13:
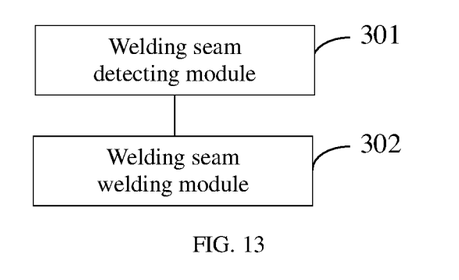
FIG. 13 is a structural schematic diagram of a device provided in an embodiment of the present application.

Based on the same concept with the automatic welding method for prestressed tubular piles provided in the embodiment, an automatic welding device for prestressed tubular piles id provided in the embodiment. The welding for prestressed tubular piles includes at least one software function module in an operation system (OS), which can be stored in memory in the form of software or solidified in the welding equipment. The processor in the welding equipment is configured to execute the executable module stored in the memory. For example, the automatic welding device for prestressed tubular piles includes software function module and computer program. Referring to FIG. 13, the automatic welding device for prestressed tubular piles can include:

a welding seam detecting module 301, configured to conduct a detection on a connection position between the prestressed tubular piles and obtain a position of a target welding seam, in which the prestressed tubular piles are arranged along a vertical direction.

In the embodiment, the welding seam detecting module 301 is configured to realize the step S101 in FIG. 1. The detail description of the welding seam detecting module 301 can refer to the description of step S101.

A welding seam welding module 302 is also includes, which is configured to weld the target welding seam around the prestressed tubular piles according to the position of the target welding seam.

In the embodiment, the welding seam welding module 302 is configured to realize the step S102 in FIG. 1. The detail description of the welding seam welding module 302 can refer to the description of step S102.

It should be noted that since the automatic welding device for prestressed tubular piles has the same concept with the automatic welding method for prestressed tubular piles, the above welding seam detecting module 301 and the welding seam welding module 302 can be further configured to realize the other steps or sub-steps in the method, which won't be repeatedly described in the embodiment.

It should be noted that, if the embodiment is realized in a form of software function form and is sold or used as an individual product, it can be stored in a computer readable storage medium. Based on this understanding, the essential part of the technical solution in the present application that makes effort to the existing technology can be expressed in a form of software product. The computer software product is stored in a storage medium including several instructions, so that a computer (personal computer, server, or network equipment) can execute all or part of the steps in various embodiments.

Therefore, a computer readable storage medium stored with computer program is further provided in the embodiment. The automatic welding method for prestressed tubular piles provided in the embodiment is performed when the computer program is executed by a processor, in which the computer readable storage medium can be USB (Universal Serial Bus) disk, mobile hard disk, ROM (Read-Only Memory), RAM (Random Access Memory), floppy disk, optical disk or any medium where the program code can be stored.

Figure 14:
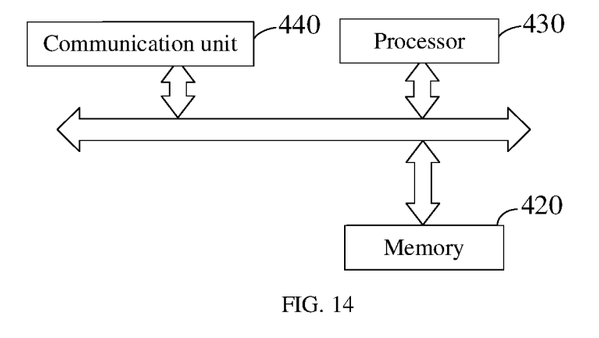
FIG. 14 is a structural schematic diagram of a control system provided in an embodiment of the present application.

A hardware structure schematic diagram of the welding equipment is provided in the embodiment. the welding equipment includes a welding equipment body and a control system for controlling the welding equipment body. As shown in FIG. 14, the control system includes a processor 430 and a memory 420. The processor 430 is communicated with the memory 420 via a system bus. In addition, a computer program is stored in the memory 420. The processor can realize the automatic welding method for prestressed tubular piles provided in the embodiment by reading and executing the computer program stored in the memory 420 that is corresponding to the above technical solution.

Further referring to FIG. 14, the memory 420, the processor and a communication unit 440 of the welding equipment are in direct or indirect electrical connection to each other, so as to realize the data transmission and interaction. For example, these elements can be electrically connected to each other via one or more communication buses or signal wires.

The memory 420 can be an information recording device based on any of the electrical, magnetic, optical or other physical principles for recording the instructions and data. In some embodiments, the memory 420 can be, but not limited to, volatile memory, non-volatile memory, and storage driver.

For example, the volatile memory can be RAM (Random Access Memory), and the non-volatile memory can be ROM (Read Only Memory), PROM (Programmable Read-Only Memory), EPROM (Erasable Programmable Read-Only Memory), EEPROM (Electric Erasable Programmable Read-Only Memory) or flash memory. The storage driver can be disk drive, solid state hard disk, any type of storage disk (such as optical disk, DVD (Digital Video Disk)), any similar storage medium or the combination thereof.

The communication unit 440 is configured for sending and receiving data via network. In some embodiments, the network can be wired network, wireless network, optical network, telecommunication network, intranet, internet, LAN (Local Area Network), WAN (Wide Area Network), WLAN ((Wireless Local Area Networks), MAN (Metropolitan Area Network), PSTN (Public Switched Telephone Network), Bluetooth, ZigBee network, NFC (Near Field Communication) or any combination thereof. In some embodiments, the network can includes one or more network accessing nodes, such as base station and/or network switching node. One or more components of the sever request processing system can be connected to the network via the accessing node to exchange data and/or information.

The processor 430 can be an integrated circuit chip with signal processing capacity. In addition, the processor can includes one or more processing cores (such as single-core processor or multi-core processor). For example, the above processor can adopts CPU (Central Processing Unit), ASIC (Application Specific Integrated Circuit), ASIP (Application Specific Instruction-set Processor), GPU (Graphics Processing Unit), PPU (Physics Processing Unit), DSP (Digital Signal Processor), FPGA (Field Programmable Gate Array), PLD (Programmable Logic Device), controller, micro controller unit, RISC (Reduced Instruction Set Computing), micro controller or any combination thereof.

The above are the preferred embodiments of the present application, which are not intended to limit the protection scope of the present application. Those skilled in the art can make modifications or replacement without effort within the technical solution disclosed in the present application, those should be covered in the protection scope of the present scope. Therefore, the protection scope of the present application should refer to the protection scope of the claims.

What is claimed is:

1. An automatic welding method for prestressed tubular piles, comprising:
   conducting a detection on a connection position between prestressed tubular piles and obtaining a position of a target welding seam, wherein the prestressed tubular piles are arranged along a vertical direction; and
   welding the target welding seam around the prestressed tubular piles according to the position of the target welding seam,
   wherein the step of welding the target welding seam around the prestressed tubular piles according to the position of the target welding seam is performed by resurfacing welding, and the resurfacing welding comprises:
      dividing the target welding seam into a plurality of welding areas according to a width and a depth of the target welding seam, wherein the plurality of welding areas is arranged along the vertical direction;
      determining a welding surface of each of the plurality of welding areas, wherein the welding surface of each of the plurality of welding areas is parallel to an outer wall of the prestressed tubular piles; and
      conducting welding on the welding surface of each of the plurality of welding areas according to a welding sequence of the plurality of welding areas.

2. The automatic welding method for prestressed tubular piles according to claim 1, wherein the step of determining the welding surface of each of the plurality of welding areas comprises:
   determining distances between the welding surface of each of the plurality of welding areas and the outer wall according to a depth and a position coefficient of each of the plurality of welding areas; and
   determining the welding surface of each of the plurality of welding areas according to the distance between the welding surface of each of the plurality of welding areas and the outer wall.

3. The automatic welding method for prestressed tubular piles according to claim 1, wherein: the plurality of welding areas comprise a lower area, a middle area and an upper area, and the step of conducting welding on the welding surface of each of the plurality of welding areas according to the welding sequence of the plurality of welding areas comprises:
   conducting welding from a starting origin in the middle area to the lower area using set process parameters for the middle area along a first welding trajectory in the middle area, wherein the first welding trajectory in the middle area is located within the welding surface of the middle area;
   conducting welding from the lower area to the middle area using set process parameters for the lower area along a welding trajectory in the lower area, wherein the welding trajectory in the lower area is located in the welding surface of the lower area;
   welding from the middle area to the upper area using the set process parameters for the middle area along a second welding trajectory in the middle area, wherein the second welding trajectory in the middle area is located in the welding surface of the middle area;
   conducting welding from the upper area to the middle area using set process parameters for the upper area along a welding trajectory in the upper area, wherein the welding trajectory in the upper area is located in the welding surface of the upper area; and
   conducting welding from the middle area to the starting origin using the set process parameters for the middle area along a third welding trajectory in the middle area, wherein the third welding trajectory in the middle area is located in the welding surface of the middle area.

4. The automatic welding method for prestressed tubular piles according to claim 3, wherein: before the step of conducting welding on the welding surface of each of the plurality of welding areas according to the welding sequence of the plurality of welding areas, the method further comprises:
   determining a central line horizontally dividing the target welding seam into two equal portions;
   determining the starting origin in the middle area according to the central line, wherein the starting origin is located above the central line; and
   placing a welding wire at the starting origin.

5. A welding equipment comprising a welding equipment body, a processor, and a memory, wherein a computer program is stored in the memory, and the automatic welding method for prestressed tubular piles according to claim 1 is performed when the computer program is executed by the processor.

* * * * *